United States Patent
Fu et al.

(10) Patent No.: US 10,965,625 B2
(45) Date of Patent: Mar. 30, 2021

(54) AUDIO PROCESSING FOR VOICE SIMULATED NOISE EFFECTS

(71) Applicant: Microsoft Technology Licensing, LLC, Redmond, WA (US)

(72) Inventors: Derrick Fu, Seattle, WA (US); Kati Amanda London, New York, NY (US); James Bigbee Garver, Redmond, WA (US); Joseph Edwin Johnson, Jr., Seattle, WA (US); Ying Wang, Bellevue, WA (US); Oussama Elachqar, Seattle, WA (US); Zhiying Zhang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/928,190

(22) Filed: Jul. 14, 2020

(65) Prior Publication Data

US 2021/0006516 A1  Jan. 7, 2021

Related U.S. Application Data

(63) Continuation of application No. 15/958,898, filed on Apr. 20, 2018, now abandoned.

(60) Provisional application No. 62/570,520, filed on Oct. 10, 2017.

(51) Int. Cl.
| | |
|---|---|
| *H04L 12/58* | (2006.01) |
| *G10L 25/24* | (2013.01) |
| *G10L 25/60* | (2013.01) |
| *G06K 9/62* | (2006.01) |
| *A63F 13/00* | (2014.01) |
| *G10L 25/51* | (2013.01) |

(52) U.S. Cl.
CPC .............. *H04L 51/02* (2013.01); *A63F 13/00* (2013.01); *G06K 9/6269* (2013.01); *G10L 25/51* (2013.01); *G10L 25/60* (2013.01); *G10L 25/24* (2013.01)

(58) Field of Classification Search
CPC ....... H04L 51/02; G06K 9/6269; A63F 13/00; A63F 13/87; A63F 13/215; A63F 13/54; A63F 13/335; G10L 25/51; G10L 25/60; G10L 25/24
See application file for complete search history.

(56) References Cited

U.S. PATENT DOCUMENTS

| | | | | |
|---|---|---|---|---|
| 7,627,477 | B2* | 12/2009 | Wang | G06K 9/00536 |
| | | | | 341/110 |
| 9,075,977 | B2* | 7/2015 | Gross | G10L 17/04 |
| 9,865,253 | B1* | 1/2018 | De Leon | G10L 17/02 |
| 2005/0091275 | A1* | 4/2005 | Burges | G11B 27/28 |

(Continued)

*Primary Examiner* — Abdullahi E Salad
(74) *Attorney, Agent, or Firm* — Schwegman Lundberg & Woessner, P.A.

(57) ABSTRACT

Systems and methods may be used to process and output information related to a non-speech vocalization, for example from a user attempting to mimic a non-speech sound. A method may include determine a mimic quality value associated with an audio file by comparing a non-speech vocalization to a prerecorded audio file. For example, the method may include determining an edit distance between the non-speech vocalization and the prerecorded audio file. The method may include assigning a mimic quality value to the audio file based on the edit distance. The method may include outputting the mimic quality value.

20 Claims, 8 Drawing Sheets

(56) References Cited

U.S. PATENT DOCUMENTS

| | | | |
|---|---|---|---|
| 2011/0019805 A1* | 1/2011 | Zoehner | H04M 3/42221 379/90.01 |
| 2012/0214564 A1* | 8/2012 | Barclay | G07F 17/3272 463/11 |
| 2013/0072270 A1* | 3/2013 | Majchrowicz | A63F 13/814 463/7 |
| 2013/0231931 A1* | 9/2013 | Kulis | G10L 15/22 704/235 |
| 2014/0116231 A1* | 5/2014 | Leflore | G09B 15/023 84/466 |
| 2015/0037778 A1* | 2/2015 | Philp | G09B 5/04 434/319 |
| 2016/0133240 A1* | 5/2016 | Cartwright | G10L 13/033 84/601 |
| 2019/0087791 A1* | 3/2019 | Delaney | G06Q 20/02 |
| 2019/0126134 A1* | 5/2019 | Booz | A63F 3/0402 |

* cited by examiner

AUDIO PROCESSING FOR VOICE SIMULATED NOISE EFFECTS

CROSS-REFERENCE TO RELATED APPLICATIONS

This application is a continuation of prior application Ser. No. 15/958,898, filed on Apr. 20, 2018, which claims the benefit of priority to U.S. Provisional Application No. 62/570,520, filed Oct. 10, 2017, titled "Audio Processing for Voice Simulated Noise Effects," which applications are hereby incorporated herein by reference in their entirety.

BACKGROUND

Audio processing techniques have become increasingly good at detecting and outputting human speech. Speech processing techniques are often inadequate at processing non-speech sound because they rely on identifying words, phrases, or syllables. When speech is not available in an audio file, it may be more difficult to identify sounds or other aspects of the audio file.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
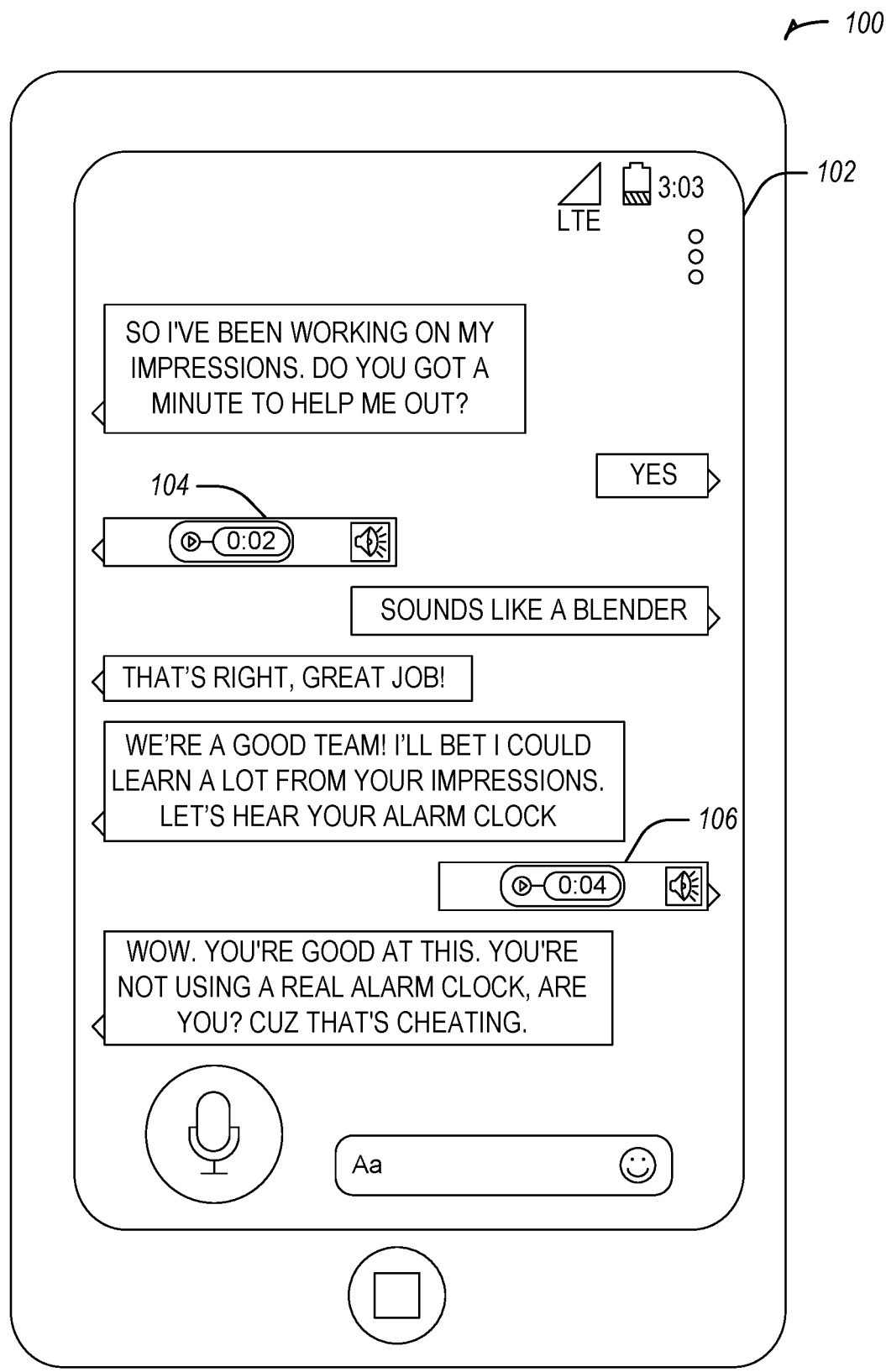
FIG. 1 illustrates a user interface on a device showing a noise imitation game interaction with a social bot in accordance with some embodiments.

Systems and methods for performing non-speech audio processing techniques are described herein. The systems and methods described herein may use the non-speech audio processing techniques to determine whether two or more audio files are related, match, or otherwise include similar characteristics. An interactive social bot or social artificial intelligence (AI) (e.g., a chat bot) may be used to facilitate a game including guessing a sound supplied by the social bot or submitting a sound (e.g., non-speech audio) for evaluation by a system.

In an example, a game may be played with a social bot. For example, the social bot may appear to be impersonating a machine. The impressions supplied by the social bot (e.g., on a user interface) may be filled with mistakes and along the way, such that the social bot engages the user to help her. The game may make a playful connection between the social bot and the world of machines, while emphasizing her human-like curiosity. As discussed herein, the social bot may be referred to using female gender pronouns, however any personality or gender may be used with the social bot described herein without deviating from the subject matter.

A technique may be used to detect whether a user is trying to imitate an everyday object such as an alarm clock, train whistle, or cellphone ringtone, such as to create an interactive game experience in social bot. The technique may include detecting if the user is making a reasonable attempt at playing the game. In an example, use Mel Frequency Cepstrum Coefficients (MFCC) may be used to describe features of an audio file, which is described further below. A vector comparison technique, such as dynamic time warping may be used to detect whether a database of examples (e.g., other humans imitating the same thing, or optionally the real noise itself, such as an actual cellphone) is like the human's input/imitation. In an example, the "correct" answer may be known ahead of time, such as when the user is asked guess it or imitate it, so comparison files may be selected as a subset of a database according to only those examples which are known to be correct, speeding up the comparison process.

In an example, the game may run at scale using lambda functions (e.g., of a cloud service) such that a large number of users may be supported, and with low latency game play (where comparison result can take a couple seconds or less).

Using the techniques described herein, a system or method may tell whether a user is humming, for instance, a short clip of happy birthday, or whether their attempt at humming happy birthday is actually closer to "happy new year." A humming detector may be used with a similar game experience using these techniques.

Additionally, this technology may be used as an initial heuristic to save training data of actual user game play (when opted in by the users). The training data may be used to train a deep learning/machine learning algorithm (such as a convolutional neural network) to do more intelligent detection of each of a number of classes (e.g. alarm clock, train whistle, police siren, cellphone ringtone, etc.), for example.

FIG. 1 illustrates a user interface 102 on a device 100 showing a noise imitation game interaction with a social bot in accordance with some embodiments. The user interface 102 shows an example conversation between a social bot (messages displayed coming from the left side of the user interface 102) and a user (messages displayed coming from the right side of the user interface 102). The conversations includes interactions, such as text interactions, and audio interactions 104 and 106. The audio interaction 104 may be a non-speech vocalization (e.g., as coming from the social bot, which may be prerecorded by a human), such as an imitation of a blender. The audio file 106 may be a non-speech vocalization by the user, for example of an alarm clock (e.g., imitating the item indicated in the previous text interaction from the social bot—the alarm clock).

The gameplay may include having the user trying to guess social bot's impressions with the delight being driven by social bot's impression itself, the uncanny choices of things to impersonate, or the struggles of social bot to get it right. An example mechanic is to ask the user to "teach" social bot how to do a better impersonation. The social bot can then give feedback on the user's input, leading to a reward at the end where the user gets an overall score/assessment.

TABLE 1

| | |
|---|---|
| Stage 1 | User triggers game through one of the two options above. Social bot gets users to guess what she is impersonating. |
| Stage 2 | After 2 impersonations from social bot, user moves to Stage 2 where social bot requests impersonations from the user. |
| Stage 3 | After 2 impersonations from user, wrap up and game exit in Stage 3. |

TABLE 2

| Trigger | Intro |
|---|---|
| @social bot: do your impressions | Social bot: "Of course! I've been working on a few. Wanna hear em?" |
| @social bot: do you do impressions | User: "Sure" |
| @social bot: can you impersonate | Social bot: "You're the best! Here's one . . . let me know what you think." |
| @social bot: talk like a machine | {impersonation} |
| @social bot: machines are all so noisy/loud! | |
| @social bot: what's with my toaster | |
| @social bot: how come machines think they can make so much noise all the time, ever think about what they're feeling? | |

The game is designed in a way that it can be easily inserted into the flow of voice chat. Therefore, it can be used to fill lulls in the conversation, which may be detected by the following triggers. For unintelligible responses, the social bot may consider environmental sound effects.

TABLE 3

| Trigger | Intro |
|---|---|
| {one word answer} ## may include patterns around when users have nothing to say. In an example, may be a separate story. | Social bot: "so I've been working on my impressions. Do you got a minute to help me out?" User: "yes" Social bot: "Awesome sauce! I'm not gonna tell you what it is. Give me your best guess!" {impersonation} |

Stage 1: The Social Bot's Impersonations

The goal is not for a set of perfect impersonations. For some responses, the social bot may have terrible attempts at impersonating a machine. For other responses, there may be a set of "better" versions that social bot can follow up with. Some examples of machines/noises that may be identified or mimicked may include:

TABLE 4

| Impersonation inventory | Hint |
|---|---|
| Police Siren | It's tough to impersonate this one cause it flies by real fast most of the time. |
| Alarm Clock | |
| Toilet flushing | Come on, you gotta use this at least once a day? |
| Camera Click | Once every two days? Not sure, I don't use it. |
| Espresso steamer | Are you sure you don't know it? You must drink |

TABLE 4-continued

| Impersonation inventory | Hint |
|---|---|
| Blender | your coffee black. |
| Window start-up | Don't tell me you've never used a PC . . . |
| Dentist drill | The scariest sound for everyone even a 22 year old AI with great teeth. |
| Truck backing up | |
| Air horn | I'm pretty sure like everyone at a hockey game has one of these. |
| Car | |
| Video chat call sound | Hmmm, do you have a fancy electric one? I hear those are a lot quieter . . . |
| Cell Phone Original Ringtone | I thought everyone had one of these back in the day. They were built like bricks. |
| Video game sound effect | I've been playing this game nonstop for 72 hours so my impersonation might be off at this point. |
| Kitty Cat | Cutest. Machine. Ever. |

For gameplay, there may be two stages. In the first stage, the social bot is imitating these sounds, and user is guessing them by name (e.g. social bot:"Wooo wooo wooo!", User: "Oh that's a train whistle!"). User may receive multiple tries at guessing per round. There may be two rounds per game. User may receive two wrong answers before they advance to the next round. User may advance to next round if they get a single right answer, such as so 2 right answers (one per round) per stage, and worst case four wrong answers (two wrong per round times two rounds) per stage. If user is being offensive, the user may be removed from the chat or the game, for example after the third continuous detected offensive statement (e.g. if user tries to harass the bot, or says offensive and insulting things, etc.).

For the second stage, when the user advances, the game may be switched around such that the user imitates the noise. The social bot may then attempt to tell whether or not the user has done a good job of imitating the noise (e.g., using the techniques described herein below). If a technique is too good or has too many errors, its accuracy may be augmented with a coin flip such that overall the successes and failures remain balanced (e.g. at 60/40), in order to give a sense of "humility" or humanity to the game play (e.g., to tease the user that their attempt is not perfect, even if it's close, get the user excited to try the game again and have fun).

After the two stages are played, we will wrap up (sort of a "third stage") and user can share their result with their friends and challenge them to play, or user can optionally, be challenged one last time by the social bot to see whether her attempt at imitation is on par (for example, the social bot may intentionally give a silly/intentionally bad impersonation in this stage to tease the user and remain humble).

The entire interaction may be voice based, for example using high fidelity (e.g., lossless or above 256 kbps compression) cloud audio (e.g., prerecorded audio), with a voice actor/actress actually attempting to do the real sounds in the first stage of the game, or using synthesized audio (e.g., for the unnamed aka "third stage" of the game). In another example, other users' audio clips may be used when the those users consent to allowing their voice imitations to be used (e.g., as a congratulations, a user with a particularly good or bad match may be offered the chance to allow their voice recording to be used). This information, with the user's consent, may also be used for training. As stated above, this game can also be used for experiences such as "happy birthday" or "happy new year" where the user hums these tunes and we have to guess what it is, or vice-versa.

Example Stage 1 Format Steps:

Lead-in for object/round #1—e.g. the social bot may say: "Here's one I've been working on. What is this thing??"

Social bot's impersonation #1
User's guess
Correct/Wrong answer response for object
User's second guess (if first was wrong)
Lead-in response for object/round #2
social bot's impersonation #2
User's guess
Correct/Wrong answer response for object
User's second guess (if first was wrong)
Go to Stage 2

TABLE 5

Stage 1 example

| | |
|---|---|
| Social bot: "Yeah! I've been working on a few. Here's one . . . let me know what you think." | ## Stage 1 Lead-in #1 |
| Social bot impersonation: {"good" police siren impersonation} | ## Social bot's 1st impersonation |
| User: "Is that a police siren?" | ## Correct answer response |
| Social bot: "Haha yeah!! Jeez they're everywhere these days. Can't a girl get some peace and quiet?" | ## Stage 1 Lead-in #2 |
| "Speaking of loud and annoying, let me try this one:" | ## Social bot's 2nd impersonation |
| {"bad" alarm clock impersonation} | ## User gets up to two tries |
| User: "uh what is that?" | |
| Social bot: "I guess I need to work on that one. It's an alarm clock! Soooo annoying! Prob the most annoying person (thing?) I talk with daily. Oooh I have another one I think you'll definitely get:" | ## Wrong answer response |
| {"good" flushing toilet impersonation} | ## Social bot's response should show a thread of connection between her and machines. |
| User: "that's a toilet" | |
| Social bot: "Yep! I've been working hard on that one. The bathroom's totally out of commission right now." {go to Stage 2} | |

Example Stage 1 Details

The social bot may send two impersonations in Stage 1. For each impersonation, the user may guess or may receive up to a number of guesses (e.g., 2 or 3 guesses). After a number of wrong guesses (1, 2, 3, etc.), the social bot may move on to the next impersonation/stage. When a guess is correct, the social bot may move on to the next impersonation or stage.

Example Stage 2: Getting Users to do Impressions

In this stage, the social bot is soliciting impersonations from the user. If there is one the user did not successfully guess earlier, that may be used for prompting. Otherwise, a random sound may be prompted from our inventory. In another example, a sound may be determined based on previous context (e.g., the user has previously detailed a love for cats).

Example Stage 2 Format

Lead-in for object #1—e.g. social bot says "We're a good team! I'll bet I could learn a lot from your impressions. Let's hear your alarm clock."
User impersonation #1
Social bot's rating of user impersonation #1
Lead-in for object #2
Social bot's rating of user impersonation #2
Go to Stage 3

For each user impersonation, the social bot may provide one of the following responses:

If the response is offensive (read: queryblocked), the social bot may choose from a set number of responses that indicate disgust and exit the game.

If the response has recognizable words, the social bot may give a "thumbs down" response. ##This may be a "short word" rule.

If the response does not fall into one or two above, the social bot may, for example, return a split of 60% "thumbs up" and 40% "thumbs down" responses. In another example, the submitted audio file may be compared to stored audio files to determine if the user's impression is accurate (e.g., using edit distance between the two audio files as detailed further below). When the impression is accurate, a thumbs up may be provided, and when inaccurate, a thumbs down may be presented. Accuracy may be further modified based on a weighting (e.g., even if very accurate, a thumbs down may be presented once every 20 times to mix up the game).

For thumbs up responses, the social bot may naturally ask the user to continue to help with another impression.

For thumbs down responses, if the social bot has not yet given the "good" impersonation, the social bot may give that and ask the user's opinion. Otherwise, the social bot may for example 50% repeat social bot's good impression, 50% move on to next impression.

TABLE 6

| "Thumbs up" | "Thumbs down" | Blocked |
|---|---|---|
| "WOW. You're good at this. You're not using a real vacuum cleaner, are you? Cuz that's cheating!" | "That was alright I guess. I think mine's better though." "that was pretty close, but I think it sounds more like this" | {show queryblock reply, repeat last instruction} |

TABLE 7

Stage 2 example

| | |
|---|---|
| Social bot: "So I def have some work to do. It would help me out a tonnnnnn if you could give me your best alarm clock impersonation" | ## Stage 2 lead-in |
| {user impression} | ## Thumbs up response from Social bot |
| Social bot: "WOW. You're good at this. You're not using a real alarm clock, are you? Cuz that's cheating. Mind doing another for me?" | ### Here, the social bot can go to the next one |
| User: "Yeah" | |
| Social bot: "Everytime you go into a store, there's that same chiming sound, do you know what I'm talking about?" | ## Thumbs down response form Social bot |
| Social bot: "can you try to do the sound?" | ## May give buttons or thumbs up/down |
| {user impression} | |
| Social bot: "that was pretty close, but I think mine's better" | |
| {"good" social bot impersonation} | |
| Social bot: "what do you think?" | |
| User: "no that's way worse" | |

Example Stage 3: Wrap Up

A wrap up editorial may be provided. For example, the social bot may send: "Thanks for all the help. Looks like I got some work to do. I'll keep you updated on my progress."

In another example, the social bot may send: "I swear I'm getting worse at these as we go lol. Oh well, I'll keep trying. Be sure to check in with me later to see how I'm doing." In an example, the game may be repeated, a stage may be repeated, or a different conversation topic may be selected. In another example, playthroughs may be limited to once per session.

In an example, during stage three, a user assessment may be presented. For example, depending on what percentage of "thumbs up" responses, the user got, the social bot may give the user an assessment. For example, if the user's "thumbs ups" is greater than or equal to the user's "thumbs down", the social bot may prompt the user to give an impression of something of their choosing. In another example, the social bot may go directly to the wrap up.

TABLE 8

Stage 3 example

| Social bot: "You'd think I'd be better at this lol. You're pretty great at impressions. What other machine do you think I should study up on?"<br>User: "A chainsaw"<br>Social bot: "Hmm yeah I dunno much about that. How about you give me your best impression of it and then I'll try?"<br>{user impression}<br>Social bot: "I think I got it"<br>{generic/catch-all social bot impression}<br>User: "that's not even close lol"<br>Social bot: "HEY I'm TRYING"<br>{wrap up} | ### Cut off at one sentence in an example<br>## Thumbs up response from Social bot<br>## Thumbs down response form Social bot for example |
|---|---|

In an example, the user may select a button to change between stages or go to a next stage. When the user does not advance, in an example, the user may be started at that stage the next time the chat is opened. For example, progress may be saved.

Figure 2:
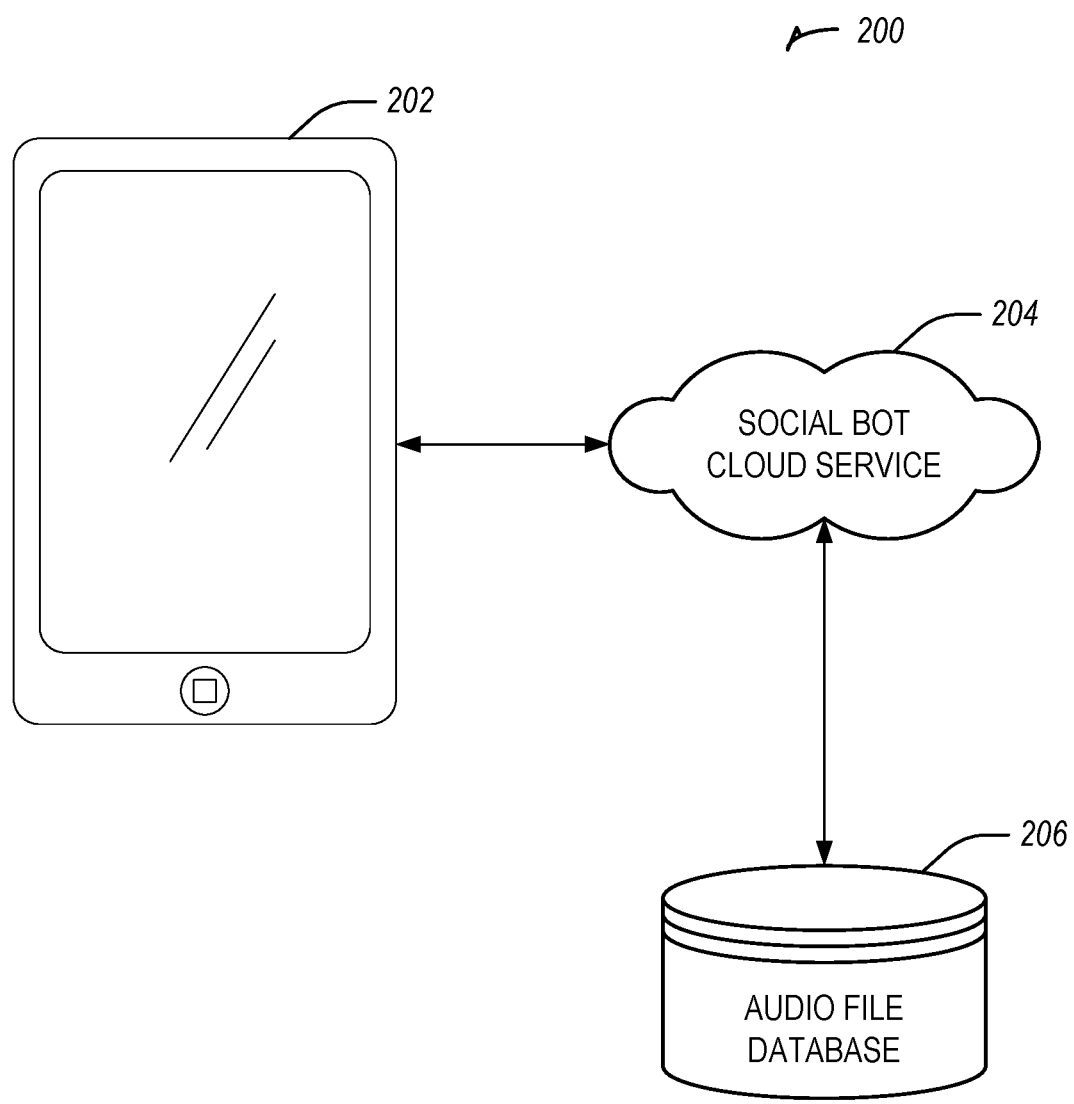
FIG. 2 illustrates a system for providing a noise imitation game interaction with a social bot in accordance with some embodiments.

FIG. 2 illustrates a system 200 for providing a noise imitation game interaction with a social bot in accordance with some embodiments. The system 200 illustrates a user device 202, which may be in communication with a social bot cloud service 204. The social bot cloud service 204 may access an audio file database 206, which may be structured. The user device 202 may be used to present a user interface for chatting with a social bot (e.g., the user interface 102 of FIG. 1). The social bot cloud service 204 may be used to supply impressions or interactions from a social bot to the user device 202. The audio file database 206 may include prerecorded audio files for comparing to user submitted imitations. The audio file database 206 may include subsets of the prerecorded audio files, such as grouped by imitation type (e.g., a subset of alarm clock imitations, a subset of cat meow imitations, etc.).

In an example, the game or stages described above with respect to FIG. 1 may be played on the user device 202 in communication with the social bot cloud service 204. In an example, a plurality of user devices may be used to play together (e.g., see which user submits a closest imitation, as judged by the social bot). An audio file may be recorded using the user device 202. The audio file may be sent to the social bot cloud service 204 to compare against prerecorded audio. In some examples, the audio may be streamed in real-time to the social bot cloud service 204 and assembled into the audio file at the social bot cloud service 204. The audio file may include non-speech noises (e.g., a machine imitation, a hummed song, "shhhhh," etc.). Guessing what the social bot is impersonating may be used as a warmup to get the user into the game (e.g., it is easier to say "cat" out loud than to "meow"). Other examples for the audio file include notification sounds for a suite of devices, time specific suggestions, TV show themes to be hummed, happy birthday—hum the song, show tunes, etc.

In an example, the social bot cloud service 204 may provide a scavenger hunt type of game, for example sending: "hey, I'm in my house, what is this noise (plays vacuum, AC, etc.)" or go find these ten noises—e.g., a vacuum cleaner, rain, a car, birds, etc.

In an example, submitting an accurate (e.g., within an edit distance) audio file may unlock a token using an impression. For example, the token may be as implemented in an alternate reality game, for example, the token may be a gateway to the alternate reality game. In another example, a successful or accurate impression may result in digital content being unlocked or sent to the user device 202. In yet another example, the social bot may ask the user for permission to share the impression on public media.

When guessing the social bot's impressions, the user may submit an answer via the user device 202 with one or more actions. For example, the user may speak 'cat', type 'cat', send an image of a cat, send an emoji of a cat, an emoticon, or the like, to guess what the impression is. When the user performs an impression, the social bot may give a rating. In another example, the social bot may give feedback correlated to the rating—this may say 'hey you're spot on' or 'hey you should work on that a bit more'. In another example, the social bot may provide neutral feedback, somewhat ambiguous feedback, or the like. The social bot may identify the impression, such as if unclear or if the user submits an audio file without prompting and the social bot cloud service 204 is able to identify the impression from the audio file database 206.

Figure 3A:
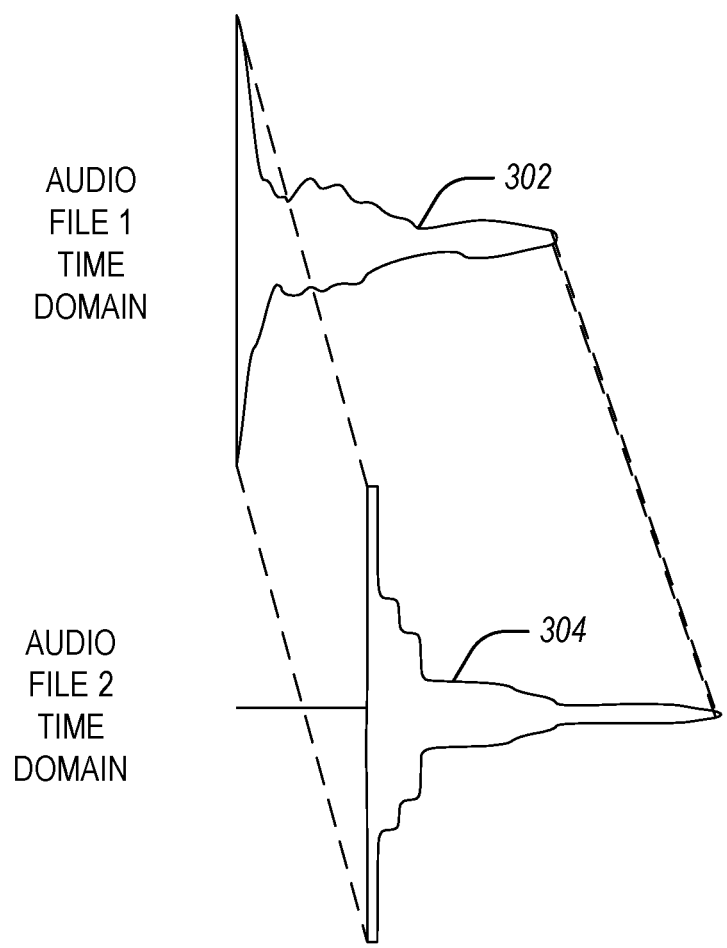
FIGS. 3A-3B illustrate a dynamic time warping technique to compare audio files in accordance with some embodiments.
Figure 3B:
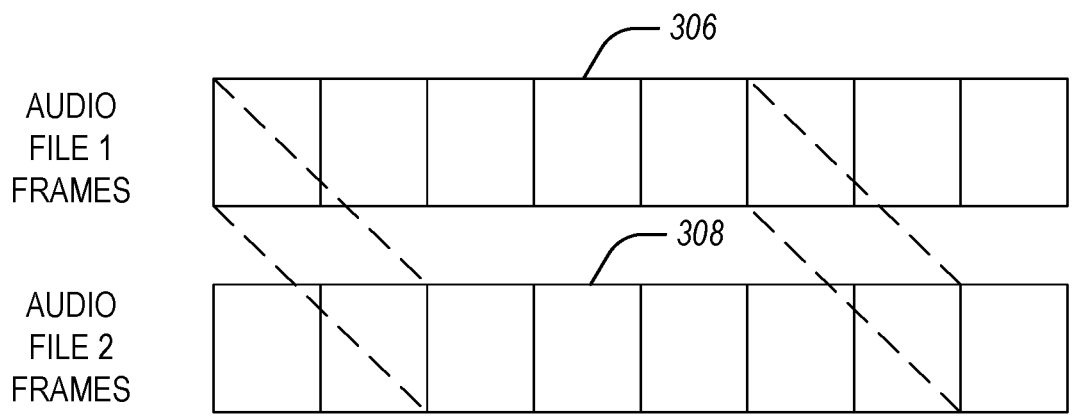

FIGS. 3A-3B illustrate a dynamic time warping technique to compare audio files in accordance with some embodiments. FIG. 3A illustrates two audio files in the time domain (e.g., power or energy of the audio files over time). The first audio file 302 may illustrate a first imitation or an actual version of a non-speech noise. The second audio file 304 may illustrate an imitation of the non-speech noise. In an example, the second audio file 304 may be offset from the first audio file 302, such that the start of the imitation of the second audio file 304 is not aligned in time with the start of the imitation or the actual version of the first audio file 302. In another example, the first audio file 302 may have a different speed or time duration for the imitation or actual version of the non-speech noise than the imitation of the second audio file 304. FIG. 3B illustrates a section of frames 306 of the first audio file and a section of frames 308 of the second audio file.

In an example, dynamic time warping may be used to align and reformat one or more of the first audio file 302, the second audio file 304, the first section of frames 306, or the second section of frames 308. The frames may then be compared to determine a distance between the audio files 302 and 304. The distance may be an edit distance (e.g., a Levenshtein distance).

In an example, determining the edit distance using dynamic time warping, wherein the first row/column may be initialized to infinity, and the distance function may include a Euclidean distance between two vectors. For example, each vector may be a frame/time-step in the source or target audio, respectively. The dynamic time warping technique outputs an alignment (e.g., series of inserts, deletes, or substitutions) to transform the source audio (e.g., the first audio file 302) into the target (e.g., the second audio file 304) or vice versa. The technique may return the alignment or the distance itself (e.g., a number of "edits" to go from source to target as described). This edit distance (e.g., over all the frames between the source and target) may be used as a comparison metric for how close the source is to the target.

The edit distance may be normalized. For example, the edit distance may have a standard deviation of one (e.g., compute standard deviation (stdev) over all frames between source and target, where target is each audio in the database we are comparing the source to); divide each Mel Frequency Cepstrum Coefficient (MFCC) column (where 13 coefficients/columns may be used, or delta between each column and frame [e.g. current frame, current column's MFCC value minus the previous frame, previous column's MFCC value], or a delta of that delta aka "double delta") by that stddev, which results in data with a stddev of 1.

In another example, edit distance may be normalized using feature scaling. For each MFCC value in each column of each audio frame of source and target, a subtraction by the mean for that coefficient/MFCC-column, e.g. 1 of 13 [or 1 of 36 with deltas and double deltas, for example adding 13 numbers with the deltas, and another 13 with the double deltas, for a total of 39, which may include a delta or a double-delta for each MFCC coefficient or column] may be used. This may be computed in the same way as the stddev over all the data described above. This feature scaling may allow the data to have a "zero mean".

In yet another example, the edit distance may be normalized using a technique for each MFCC value x, with other conditions remaining the same, performing a (x−min)/(max−min) where max and min are computed over all the MFCC values per column in the same way described above. This normalizes the data to between 0 and 1 and acts as a percentage.

In an example, some of the audio frames of the first subset of frames 306 or the second subset of frames 308 may be trimmed. For example, the frames that don't appear to be voiced may be removed (e.g., based on energy or other heuristics such as signal to noise ratio). These frames may be likely to be white noise and contribute to error in the computation. In another examples, one or both of the subsets 306 or 308 may be trimmed by truncating the audio for source or target after a fixed number of frames (e.g., the sample average, or a fixed number, e.g. 3 or 4 seconds of frames, where each frame may be 25 ms for example).

In an example, a technique may include determining whether the audio file 304 is close enough to the audio file 302 using one or more of the techniques described below.

When the audio file 304 is below the minimum threshold (e.g., established empirically or through machine learning training to find the optimal threshold), then a match may be determined. When the audio file 304 is below the "average" threshold similar to the minimum (e.g., usually higher than min), then a match may be determined. When the audio file 304 is below both the minimum and average (this may increase precision at cost of recall, so there are less false positives), a match may be determined.

In an example, the minimum value may be compared to a sample of impressions and a sample of non-impressions, and whichever is compared to be closer may be selected as the response (e.g., when closer to the impression than the non-impression, the impression is deemed accurate or valid). For example, when the minimum value or nearest neighbor to the audio file 304 is an impression of a vacuum, instead of actual people talking, then the audio file 304 may be declared as a match to a vacuum impression.

When an output of a machine learning classifier (e.g., a support vector machines) determines the audio file 304 impression matches the audio file 302, it may be deemed a match. Features (e.g., inputs) to the model may include: a computed dynamic time warping distance above (e.g., raw/original value, and all normalized variations), one of each of these (e.g., a set of these features for source, and a set for target), the F0 (fundamental frequency), min, max, mean, stddev, or the like. In an example, for each MFCC column, other features may be used, such as the absolute position (frame number), including a maximum MFCC value (from each column/coefficient) across all the frames, a minimum MFCC value, a mean of the MFCC, percentiles or quartiles of the MFCC, a stddev of the MFCC, a slope of a line fitted to the MFCC contour, am error (of actual vs slope/predicted), a percent of time (e.g., number of frames) that the min or max is above or below each of the percentiles (1%, 50%, 75%, 90%, 99%), or the like. In an example, features may include a root-mean-square signal frame energy, MFCC coefficients 1-12, zero-crossing rate of time signal, a voicing probability, a skewness ($3^{rd}$ order moment), a kurtosis ($4^{th}$ order moment), normalized loudness, logarithmic power of Mel-frequency bands 0-7, an envelope of a smoothed fundamental frequency contour, absolute position of a max value or a min value, a slope or offset of a linear approximation of a contour, a smoothed fundamental frequency contour, a frame to frame jitter, a differential frame to frame jitter (e.g. the jitter of the jitter), a frame to frame shimmer (e.g., amplitude deviation between pitch periods), or the like.

In another example, the output of a deep learning classifier (e.g., a convolutional neural network) may be used to determine whether the audio file 302 matches the audio file 304.

The deep learning classifier may use an input of an image (e.g., a spectrum/spectrogram [see FIG. 4 below]). For example, the x/horizontal dimension may be a timestamp (e.g., frame number of frames 308), which may be fixed (e.g., up to 1000 frames/timesteps). The y/vertical dimension may be a frequency. Each timestamp/frame may be a histogram of frequencies detected (e.g., with one of them being the F0, fundamental frequency). Formants in the audio may also be visualized this way.

This "image" (e.g., a matrix) may be input into the convolutional neural network, which may operate or convolve over the spectrogram to detect features (e.g., a shared weight matrix). The features may run through a series of hidden layers to detect, at the end, true/false (e.g., recognized or not, authentic or not, or close enough or not to the trained frames or audio file 302). Training data may include these spectrograms (e.g., Mel/MFCC frequency data or raw waveform spectrum), such as with a fixed size (e.g., always 3-4 seconds worth of audio, etc.). In an example, the accuracy may be increased by using transfer learning when a good dataset is used (e.g., a large trained convolutional neural network model on speech data, similar to how resnet or imagenet or vgg is used for transfer learning in the image classification domain, but in the audio domain and on audio examples).

In an example, the accuracy of any of the approaches described above may be increased using speech recognition. Words may be detected, such as "woosh" or "sh" or when the words are closer to gibberish than to real sentences (detected using language modelling techniques such as markov chains/n-gram models, which may be smoothed or used with backoff techniques like katz backoff, laplace backoff, etc.). The audio file 304 may be declared as an "impression" rather than a "non-impression" (e.g., where a non-impression is a user not attempting to make an effort toward using the skill) when the gibberish words are detected or a non-impression when actual words are detected.

Figure 4:
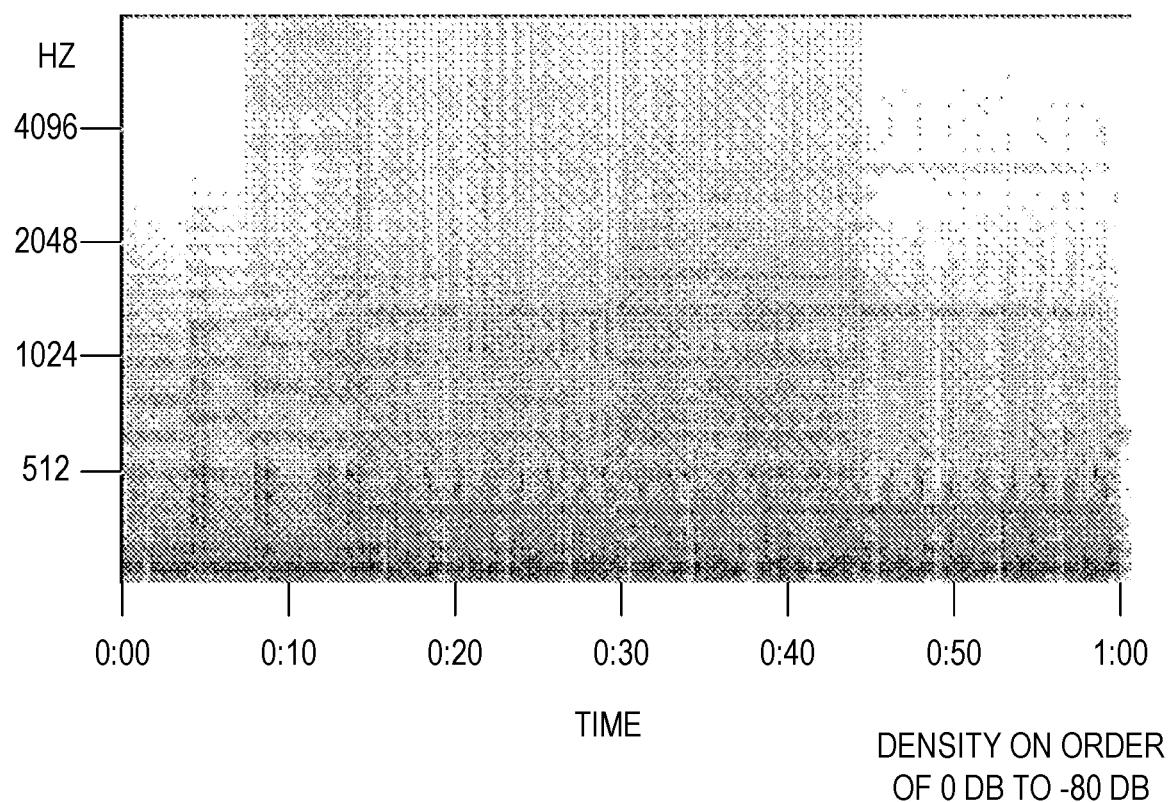
FIG. 4 illustrates a Mel spectrogram of an audio file in accordance with some embodiments.

FIG. 4 illustrates a Mel spectrogram 400 of an audio file in accordance with some embodiments. The Mel spectrogram 400 may be used with the deep learning classifier as described above for FIGS. 3A-3B.

Figure 5:
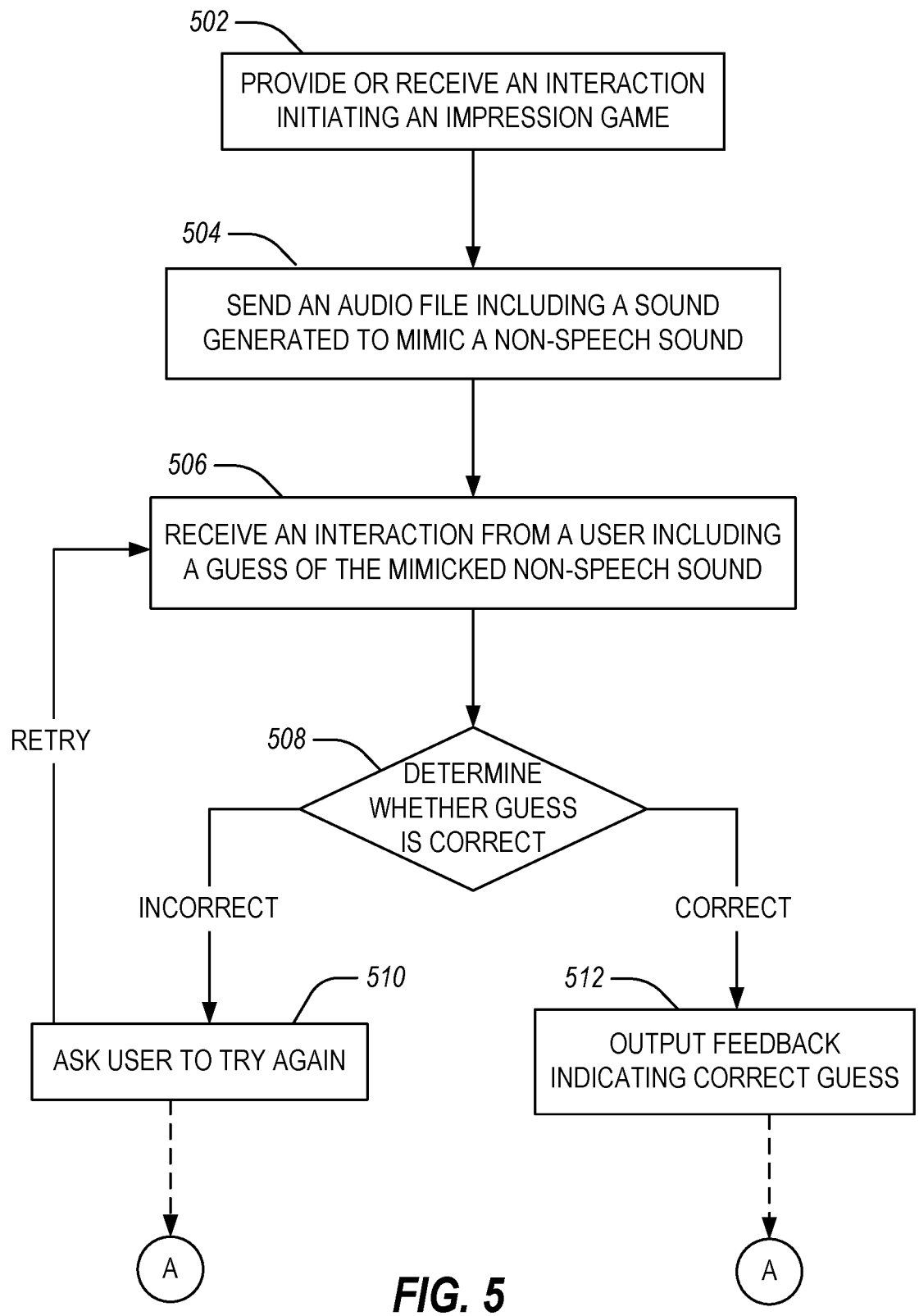
FIG. 5 illustrates a flowchart showing a technique for providing a noise effect guessing game to be played with a social bot in accordance with some embodiments.

FIG. 5 illustrates a flowchart showing a technique 500 for providing a noise effect guessing game to be played with a social bot in accordance with some embodiments. The technique 500 includes an operation 502 to provide or receive an interaction initiating an impression game. In an example, operation 502 may start in response to operation 610 completing from FIG. 6 below, may be initiated by a user, or by a social bot, or the like. The technique 500 includes an operation 504 to send an audio file including a sound generated to mimic a non-speech sound.

The technique 500 includes an operation 506 to receive an interaction from a user including a guess of the mimicked non-speech sound. In an example, the interaction from the user may include a text response, a spoken response, an emoji response, an image response, an emoticon response, or the like. The technique 500 includes a decision operation 508 to determine whether a guess is correct. The technique 500 includes an operation 510 to ask the user to try again in response to the guess being incorrect, in an example. The technique 500 may continue to 'A', may return to operation 506 to receive a second guess, for example, or may end. In an example, when the guess is incorrect, the social bot may provide a contextual clue related to the non-speech sound. The technique 500 includes an operation 512 to output feedback indicating a correct guess, in response to the guess being correct, in an example. The technique 500 may continue to 'A' or may end.

Figure 6:
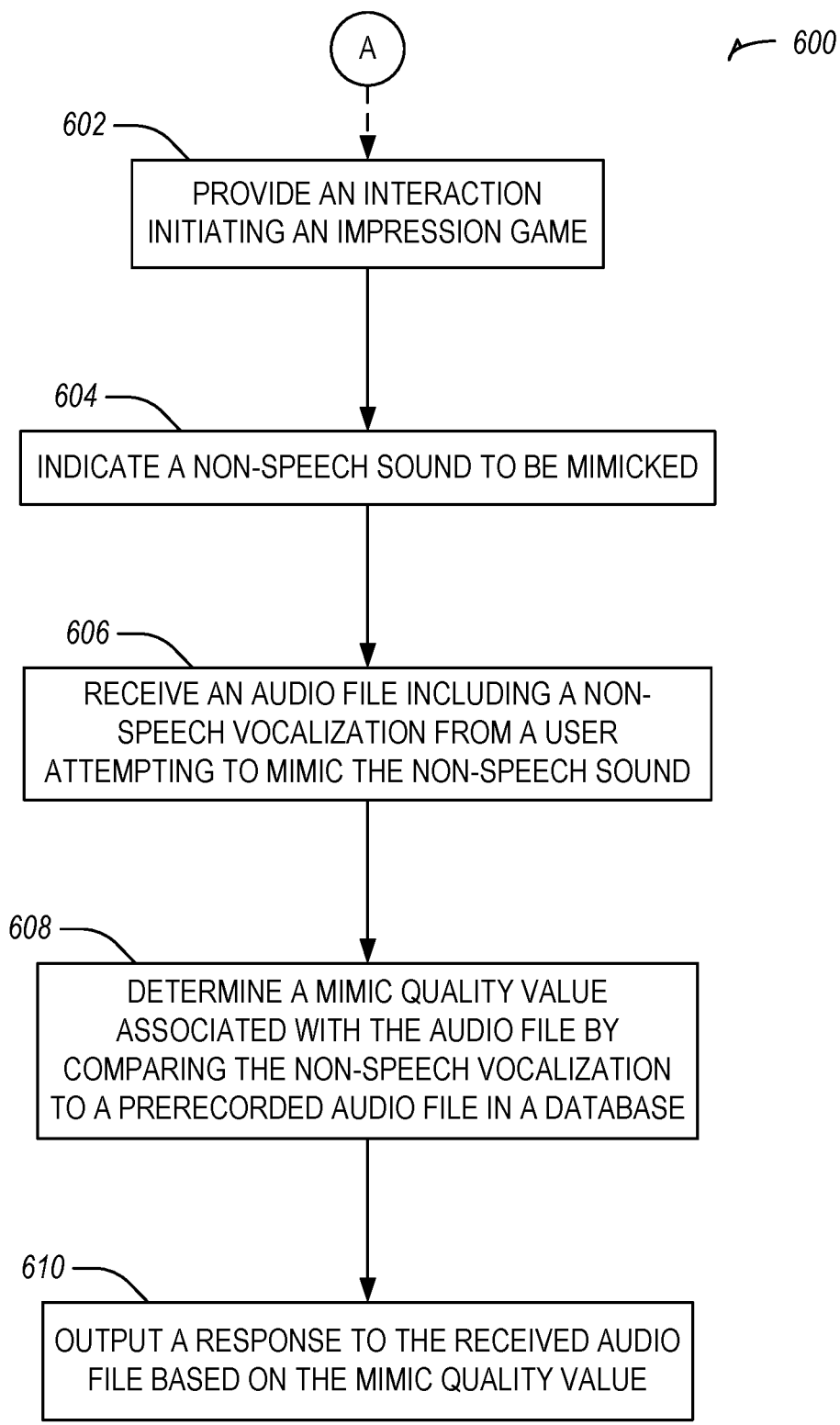
FIG. 6 illustrates a flowchart showing a technique for evaluating an user submitted audio noise effect and providing feedback in accordance with some embodiments.

FIG. 6 illustrates a flowchart showing a technique 600 for evaluating an user submitted audio noise effect and providing feedback in accordance with some embodiments. The technique 600 includes an operation 602 to provide an interaction initiating an impression game. Operation 602 may start in response to operation 510 or 512 completing from FIG. 5, in an example, may be initiated by a user, or by a social bot. The technique 600 includes an operation 604 to indicate a non-speech sound to be mimicked. The technique 600 includes an operation 606 to receive an audio file including a non-speech vocalization from a user attempting to mimic the non-speech sound. In an example, the non-speech sound to be mimicked may include an animal noise, a machine generated noise, a melody, or the like.

The technique 600 includes an operation 608 to determine a mimic quality value associated with the audio file by comparing the non-speech vocalization to a prerecorded audio file in a database. Operation 608 may include comparing the non-speech vocalization to a plurality of prerecorded audio files in a database. In an example, the database may be a structured database of prerecorded audio files arranged by non-speech sound. Comparing the non-speech vocalization to the prerecorded audio file may include selecting the prerecorded audio file from the structured database based on the non-speech sound to be mimicked indicated in the interaction. A prerecorded audio file may be a recording of the non-speech sound to be mimicked, such as a recording of a machine or animal. In another example, a prerecorded audio file may be a recording of a person mimicking the non-speech sound. Operation 608 may include determining whether the non-speech vocalization is within a predetermined edit distance of the prerecorded audio file. For example, the edit distance may be determined using a minimum threshold, an average threshold, both a minimum and an average threshold, a comparison of the minimum distance value to a sample of impressions and a sample of non-impressions, a machine learning classifier (e.g., a support vector machine), a deep learning classifier (e.g., a convolutional neural network) or the like.

The technique 600 includes an operation 610 to output a response to the received audio file based on the mimic quality value. In an example, the response may be neutral when the mimic quality value is determined to be low or negative. In an example, when the response may be positive when the non-speech vocalization is within the predetermined edit distance. In an example, a token may be provided via the user interface in response to the mimic quality value exceeding a threshold. The token may be used to unlock digital content. In an example, operation 610 may include using dynamic time warping or MFCC, for example by performing a fast fourier transform on the audio file and the prerecorded audio file, mapping results of the fast fourier transform to a mel scale, and determining amplitudes of the results mapped to the mel scale, including a first series of amplitudes corresponding to the audio file and a second series of amplitudes corresponding to the prerecorded audio file. The edit distance may be a number of changes, substitutions, edits, or deletions needed to convert the audio file to the prerecorded audio file. In an example, a discrete cosine transform operation may be performed after the fast fourier transform, which may be used to generalize or compress the audio file or the prerecorded audio file.

The audio file may be normalized using a standard deviation. The technique 600 may include detecting a spoken word in the audio file. The spoken word may be used to determine the mimic quality value. In an example, comparing the non-speech vocalization to the prerecorded audio file may include comparing an extracted speech portion of the audio file to a speech portion of the prerecorded audio file.

Figure 7:
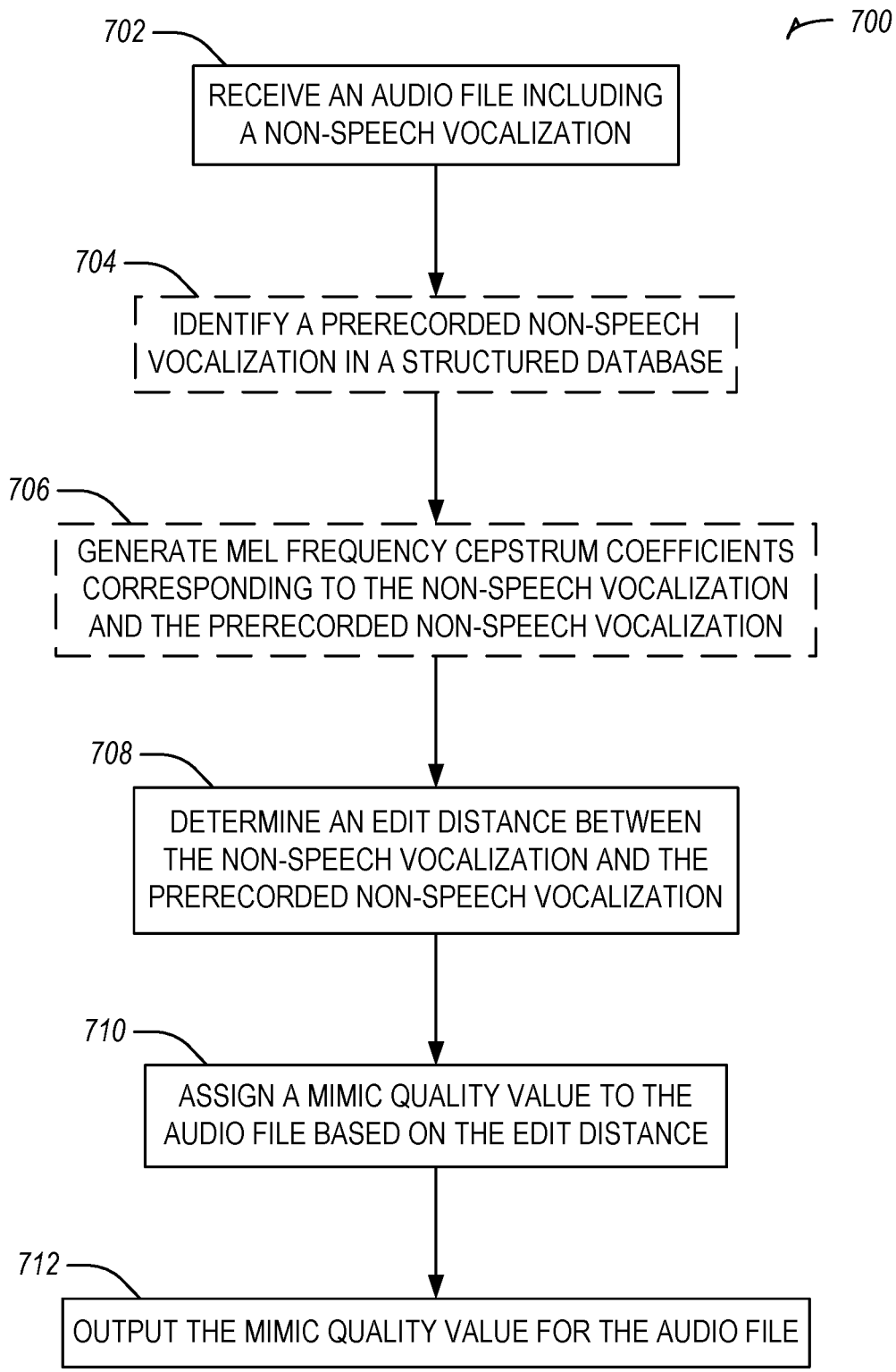
FIG. 7 illustrates a flowchart showing a technique for comparing audio files using an edit distance technique in accordance with some embodiments.

FIG. 7 illustrates a flowchart showing a technique 700 for comparing audio files using an edit distance technique in accordance with some embodiments. The technique 700 may be used in conjunction with operations from techniques 500 or 600 described above with respect to FIGS. 5 and 6 respectively, or may operate as a stand-alone technique. For example, the technique 700 may process user supplied audio from technique 600. In another example, the technique 700 may process audio unconnected to a social bot or social AI. For example, the technique 700 may be used to provide security (e.g., comparing audio frames to prerecorded audio frames to determine whether credentials in the form of a user voiced noise effect have been supplied by the user). In another example, the technique 700 may be used for selecting an item or ordering a product (e.g., by receiving a noise effect vocalized by a user, such as a cow sound 'moo', the user may be selecting milk). In another example, the technique 700 may be used with an alarm clock, for example by requiring a user to mimic a noise effect to ensure the user is awake to turn off the alarm.

The technique 700 includes an operation 702 to receive an audio file including a non-speech vocalization. The non-speech vocalization may include a machine generated sound, an animal or instrument generated sound, or a human recorded voice mimicking a sound. The technique 700 includes an optional operation 704 to identify a prerecorded non-speech vocalization in a structured database. The technique 700 includes an optional operation 706 to generate Mel Frequency Cepstrum Coefficients corresponding to the non-speech vocalization and the prerecorded non-speech vocalization.

The technique 700 includes an operation 708 to determine an edit distance between the non-speech vocalization and the prerecorded non-speech vocalization. Operation 708 may include performing dynamic time warping on the Mel Frequency Cepstrum Coefficients corresponding to the audio file and the Mel Frequency Cepstrum Coefficients corresponding to the prerecorded audio file. In an example, the edit distance may include a Euclidean distance between two vectors corresponding to frames of the audio file and the prerecorded audio file (e.g., using a Levenshtein distance technique).

The technique 700 includes an operation 710 to assign a mimic quality value to the audio file based on the edit distance. In an example, assigning the mimic quality value includes determining whether the edit distance falls within a predetermined maximum edit distance. Operation 708 may include normalizing the edit distance, for example using a standard deviation, such as a standard deviation set to equal 1 for the MFCC, feature scaling, trimming audio frames (or truncating), or the like. Operation 710 may include determining whether the edit distance between the non-speech vocalization and the prerecorded audio file is within a threshold edit distance. The threshold may be a minimum threshold determined through machine learning, an average threshold, a minimum of the minimum threshold determined through machine learning and the average threshold, or the like. Operation 710 may include comparing the edit distance to a second edit distance between the non-speech vocalization and a base audio recording file, which may include speech vocalizations. Operation 710 may include using a machine learning classifier (e.g., a support vector machine) to determine whether the non-speech vocalization matches the prerecorded audio file. Operation 710 may include using a deep learning classifier (e.g., a convolutional neural network) to determine whether the non-speech vocalization matches the prerecorded audio file. The technique 700 includes an operation 712 to output the mimic quality value for the audio file.

Figure 8:
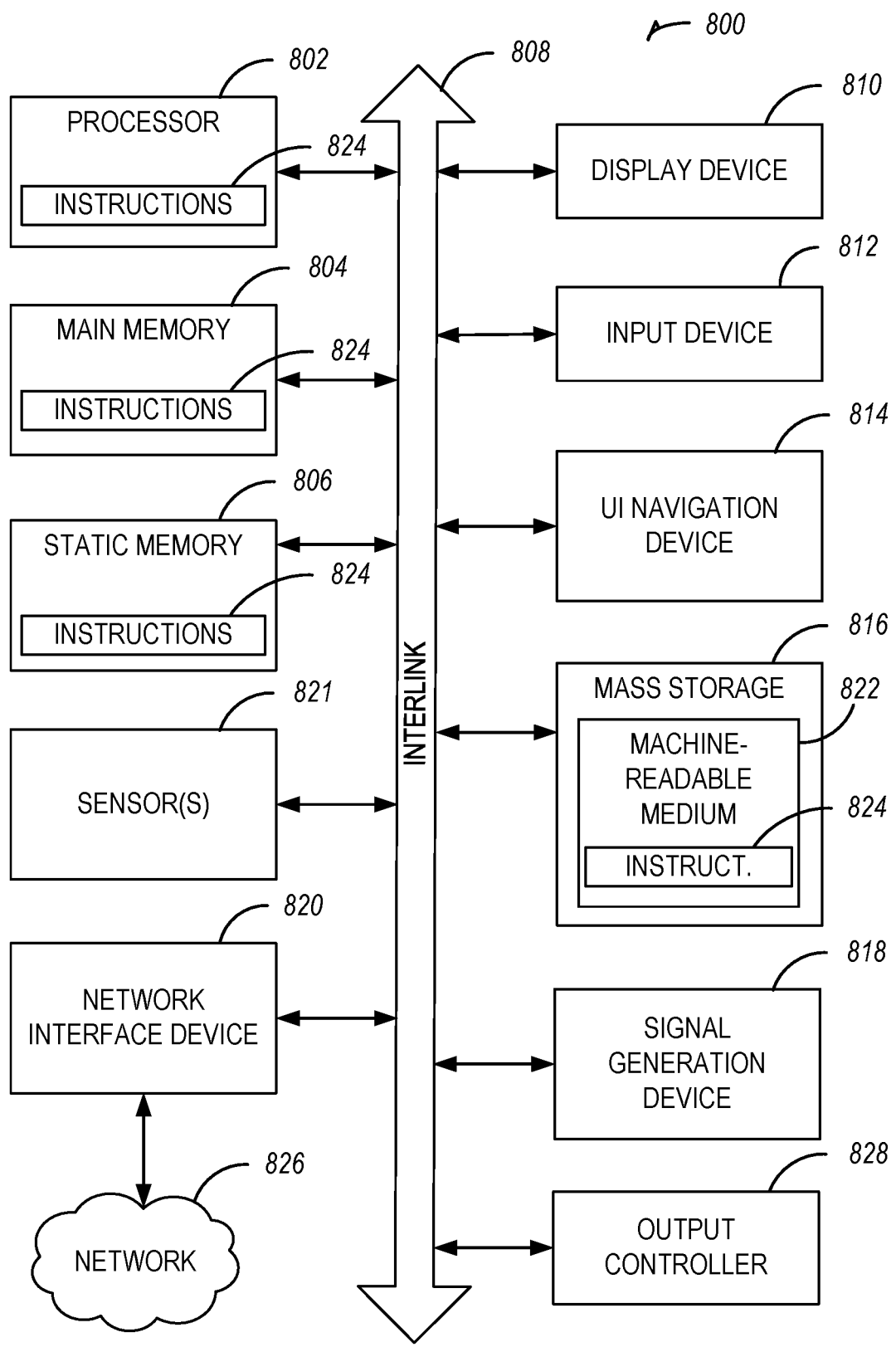
FIG. 8 illustrates generally an example of a block diagram of a machine upon which any one or more of the techniques discussed herein may perform in accordance with some embodiments.

FIG. 8 illustrates generally an example of a block diagram of a machine 800 upon which any one or more of the techniques (e.g., methodologies) discussed herein may perform in accordance with some embodiments. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a display unit 810, an alphanumeric input device 812 (e.g., a keyboard), and a user interface (UI) navigation device 814 (e.g., a mouse). In an example, the display unit 810, alphanumeric input device 812 and UI navigation device 814 may be a touch screen display. The machine 800 may additionally include a storage device (e.g., drive unit) 816, a signal generation device 818 (e.g., a speaker), a network interface device 820, and one or more sensors 821, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 816 may include a machine readable medium 822 that is non-transitory on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine readable media.

While the machine readable medium 822 is illustrated as a single medium, the term "machine readable medium" may include a single medium or multiple media (e.g., a centralized or distributed database, or associated caches and servers) configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software.

VARIOUS NOTES & EXAMPLES

Each of these non-limiting examples may stand on its own, or may be combined in various permutations or combinations with one or more of the other examples.

Example 1 is a device comprising: a display to provide a user interface for interacting with a social bot; and a processor to: provide an interaction initiating an impression game within the user interface with the social bot, the interaction indicating a non-speech sound to be mimicked; receive an audio file including a non-speech vocalization from a user attempting to mimic the non-speech sound via the user interface; determine a mimic quality value associated with the audio file by comparing the non-speech vocalization to a prerecorded audio file in a database; and output a response to the received audio file from the social bot for display on the user interface based on the mimic quality value.

In Example 2, the subject matter of Example 1 includes, wherein the response is neutral when the mimic quality value is determined to be low or negative.

In Example 3, the subject matter of Examples 1-2 includes, wherein determining the mimic quality value includes comparing the non-speech vocalization to a plurality of prerecorded audio files in the database.

In Example 4, the subject matter of Examples 1-3 includes, wherein the prerecorded audio file is a recording of the non-speech sound to be mimicked.

In Example 5, the subject matter of Examples 1-4 includes, wherein the prerecorded audio file is a recording of a person mimicking the non-speech sound.

In Example 6, the subject matter of Examples 1-5 includes, generating an auditory interaction mimicking a second non-speech sound to be presented from the social bot via the user interface.

In Example 7, the subject matter of Example 6 includes, receiving a user guess of the second non-speech sound in the auditory interaction, and providing, from the social bot, a response to the user guess via the user interface.

In Example 8, the subject matter of Example 7 includes, wherein the user guess includes at least one of a text response, a spoken response, an emoji response, an emoticon response, or an image response.

In Example 9, the subject matter of Examples 6-8 includes, presenting the auditory interaction via the user interface from the social bot and a contextual clue related to the second non-speech sound.

In Example 10, the subject matter of Examples 1-9 includes, wherein the non-speech sound to be mimicked includes an animal noise, a machine generated noise, or a melody.

In Example 11, the subject matter of Examples 1-10 includes, providing a token via the user interface in response to the mimic quality value exceeding a threshold, the token used to unlock digital content.

In Example 12, the subject matter of Examples 1-11 includes, wherein determining the mimic quality value includes determining whether the non-speech vocalization is within a predetermined edit distance of the prerecorded audio file.

In Example 13, the subject matter of Example 12 includes, wherein the response is positive when the non-speech vocalization is within the predetermined edit distance.

In Example 14, the subject matter of Examples 12-13 includes, wherein determining whether the non-speech vocalization is within the predetermined edit distance of the prerecorded audio file includes using dynamic time warping.

In Example 15, the subject matter of Examples 12-14 includes, wherein determining whether the non-speech vocalization is within the predetermined edit distance of the prerecorded audio file includes using Mel Frequency Cepstrum Coefficients representing the audio file and the prerecorded audio file to compare frames of the audio file to frames of the prerecorded audio file to determine an edit distance between the audio file and the prerecorded audio file.

In Example 16, the subject matter of Example 15 includes, wherein the Mel Frequency Cepstrum Coefficients are generated by performing a fast fourier transform on the audio file and the prerecorded audio file, mapping results of the fast fourier transform to a Mel scale, and determining amplitudes of the results mapped to the Mel scale, including a first series of amplitudes corresponding to the audio file and a second series of amplitudes corresponding to the prerecorded audio file.

In Example 17, the subject matter of Examples 12-16 includes, wherein the edit distance is a number of changes, edits, or deletions needed to convert the audio file to the prerecorded audio file.

In Example 18, the subject matter of Examples 12-17 includes, normalizing the audio file using a standard deviation across frames of the audio file.

In Example 19, the subject matter of Examples 1-18 includes, wherein the database is a structured database of prerecorded audio files arranged by non-speech sound, and wherein comparing the non-speech vocalization to the prerecorded audio file includes selecting the prerecorded audio file from the structured database based on the non-speech sound to be mimicked indicated in the interaction.

In Example 20, the subject matter of Examples 1-19 includes, detecting a spoken word in the audio file and using the spoken word to determine the mimic quality value.

In Example 21, the subject matter of Examples 1-20 includes, wherein comparing the non-speech vocalization to the prerecorded audio file includes comparing an extracted speech portion of the audio file to a speech portion of the prerecorded audio file.

Example 22 is a method to perform a technique using any of the devices of Examples 1-21.

Example 23 is at least one machine readable medium including instructions, which when executed by a machine, cause the machine to perform the technique of Example 22.

Example 24 is a method comprising: receiving an audio file including a non-speech vocalization and an identifier; identifying a prerecorded audio file including non-speech sound in a structured database using the identifier; determining an edit distance between the non-speech vocalization and the prerecorded audio file using dynamic time warping; assigning a mimic quality value to the audio file based on the edit distance; and outputting the mimic quality value for the audio file.

In Example 25, the subject matter of Example 24 includes, wherein determining the edit distance between the non-speech vocalization and the prerecorded audio file using dynamic time warping includes performing dynamic time warping on a first set of Mel Frequency Cepstrum Coefficients corresponding to the audio file and a second set of Mel Frequency Cepstrum Coefficients corresponding to the prerecorded audio file.

In Example 26, the subject matter of Examples 24-25 includes, wherein assigning the mimic quality value includes normalizing the edit distance.

In Example 27, the subject matter of Example 26 includes, wherein normalizing the edit distance includes setting a standard deviation to equal one for the first set of Mel Frequency Cepstrum Coefficients.

In Example 28, the subject matter of Examples 26-27 includes, wherein normalizing the edit distance includes feature scaling the first set of Mel Frequency Cepstrum Coefficients.

In Example 29, the subject matter of Examples 26-28 includes, wherein normalizing the edit distance includes trimming audio frames from the audio file including at least one of trimming non-voiced frames or truncating end frames.

In Example 30, the subject matter of Examples 24-29 includes, wherein determining the edit distance includes determining a Euclidean distance between two vectors corresponding to frames of the audio file and the prerecorded audio file.

In Example 31, the subject matter of Examples 24-30 includes, wherein the non-speech sound is one of a vocalization or a machine generated sound.

In Example 32, the subject matter of Examples 24-31 includes, wherein assigning the mimic quality value to the audio file includes determining whether the edit distance between the non-speech vocalization and the prerecorded audio file is within a threshold edit distance.

In Example 33, the subject matter of Example 32 includes, wherein the threshold distance is a minimum threshold determined through machine learning, an average threshold, or a minimum of the minimum threshold determined through machine learning and the average threshold.

In Example 34, the subject matter of Examples 24-33 includes, wherein assigning the mimic quality value to the audio file includes comparing the edit distance to a second edit distance determine between the non-speech vocalization and a base audio recording file.

In Example 35, the subject matter of Example 34 includes, wherein the base audio recording file includes speech vocalizations.

In Example 36, the subject matter of Examples 24-35 includes, wherein assigning the mimic quality value to the audio file includes using a machine learning classifier to determine whether the non-speech vocalization matches the prerecorded audio file.

In Example 37, the subject matter of Example 36 includes, wherein the machine learning classifier uses a support vector machine.

In Example 38, the subject matter of Examples 24-37 includes, wherein assigning the mimic quality value to the audio file includes using a deep learning classifier to determine whether the non-speech vocalization matches the prerecorded audio file.

In Example 39, the subject matter of Example 38 includes, wherein the deep learning classifier is a convolutional neural network.

In Example 40, the subject matter of Examples 24-39 includes, wherein assigning the mimic quality value to the audio file includes using detecting a spoken word in the audio file.

Example 41 is a device comprising: a display to provide a user interface for interacting with a social bot; and a processor to perform any of the techniques of Examples 24-40.

Example 42 is at least one machine readable medium including instructions, which when executed by a machine, cause the machine to perform any of the techniques of Examples 24-40.

Example 43 is a method comprising: receiving an audio file including a non-speech vocalization and an identifier; identifying a prerecorded non-speech vocalization in a structured database using the identifier; generating a first set and a second set of Mel Frequency Cepstrum Coefficients corresponding to the non-speech vocalization and the prerecorded non-speech vocalization respectively; determining an edit distance between the non-speech vocalization and the prerecorded non-speech vocalization by comparing the first set to the second set using dynamic time warping; assigning a mimic quality value to the audio file based on the edit distance; and outputting the mimic quality value for the audio file.

In Example 44, the subject matter of Example 43 includes, wherein assigning the mimic quality value includes determining whether the edit distance falls within a predetermined maximum edit distance.

Example 45 is a device comprising: a display to provide a user interface for interacting with a social bot; and a processor to perform any of the techniques of Examples 43-44.

Example 46 is at least one machine readable medium including instructions, which when executed by a machine, cause the machine to perform any of the techniques of Examples 43-44.

Example 47 is at least one machine-readable medium including instructions that, when executed by processing circuitry, cause the processing circuitry to perform operations to implement of any of Examples 1-46.

Example 48 is an apparatus comprising means to implement of any of Examples 1-46.

Example 49 is a system to implement of any of Examples 1-46.

Example 50 is a method to implement of any of Examples 1-46.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A device comprising:
a display to provide a user interface for interacting with a chat bot;
memory; and
a processor in communication with the memory, the processor to:
initiate a chat session with the chat bot within the user interface;
receive an audio file or streamed audio from a user within the chat session, the audio file or streamed audio including a non-speech vocalization from the user via the user interface;
identify a prerecorded non-speech audio file stored in a database;
determine a similarity characteristic based on a comparison of the non-speech vocalization to the prerecorded non-speech audio file; and
output a response to the received audio file or the streamed audio from the chat bot for display in the chat session on the user interface based on the similarity characteristic.

2. The device of claim 1, wherein the similarity characteristic is based on an edit distance from the non-speech vocalization to the prerecorded non-speech audio file.

3. The device of claim 2, wherein the edit distance is determined using a threshold.

4. The device of claim 2, wherein the edit distance is determined using a machine learning classifier.

5. The device of claim 2, wherein the edit distance is determined using dynamic time warping.

6. The device of claim 2, wherein the edit distance is determined using Mel Frequency Cepstrum Coefficients representing the audio file or the streamed audio and the prerecorded audio file to compare frames of the audio file or the streamed audio to frames of the prerecorded audio file.

7. The device of claim 6, wherein the Mel Frequency Cepstrum Coefficients are generated by performing a fast fourier transform on the audio file or the streamed audio and the prerecorded audio file, mapping results of the fast fourier transform to a Mel scale, and determining amplitudes of the results mapped to the Mel scale, including a first series of amplitudes corresponding to the audio file or the streamed audio and a second series of amplitudes corresponding to the prerecorded audio file.

8. The device of claim 2, wherein the edit distance is a number of changes, edits, or deletions needed to convert the audio file or the streamed audio to the prerecorded audio file.

9. The device of claim 1, wherein the prerecorded non-speech audio file is a recording of a non-speech sound generated by an object.

10. A method comprising:
using a processor in communication with memory to:
initiate a chat session with a chat bot within a user interface;
receive an audio file or streamed audio from a user within the chat session, the audio file or streamed audio including a non-speech vocalization from the user via the user interface;
identify a prerecorded non-speech audio file stored in a database;
determine a similarity characteristic based on a comparison of the non-speech vocalization to the prerecorded non-speech audio file; and
output a response to the received audio file or the streamed audio from the chat bot for display in the chat session on the user interface based on the similarity characteristic.

11. The method of claim 10, wherein the similarity characteristic is based on an edit distance from the non-speech vocalization to the prerecorded non-speech audio file.

12. The method of claim 11, wherein the edit distance is determined using a threshold.

13. The method of claim 11, wherein the edit distance is determined using a machine learning classifier.

14. The method of claim 11, wherein the edit distance is determined using dynamic time warping.

15. The method of claim 11, wherein the edit distance is determined using Mel Frequency Cepstrum Coefficients representing the audio file or the streamed audio and the prerecorded audio file to compare frames of the audio file or the streamed audio to frames of the prerecorded audio file.

16. The method of claim 15, wherein the Mel Frequency Cepstrum Coefficients are generated by performing a fast fourier transform on the audio file or the streamed audio and the prerecorded audio file, mapping results of the fast fourier transform to a Mel scale, and determining amplitudes of the results mapped to the Mel scale, including a first series of amplitudes corresponding to the audio file or the streamed audio and a second series of amplitudes corresponding to the prerecorded audio file.

17. The method of claim 11, wherein the edit distance is a number of changes, edits, or deletions needed to convert the audio file or the streamed audio to the prerecorded audio file.

18. The method of claim 10, wherein the prerecorded non-speech audio file is a recording of a non-speech sound generated by an object.

19. At least one non-transitory machine-readable medium including instructions for providing a user interface on a display for interacting with a chat bot, which when executed by a processor, cause the processor to:
initiate a chat session with the chat bot within the user interface;
receive an audio file or streamed audio from a user within the chat session, the audio file or streamed audio including a non-speech vocalization from the user via the user interface;
identify a prerecorded non-speech audio file stored in a database;
determine a similarity characteristic based on a comparison of the non-speech vocalization to the prerecorded non-speech audio file; and
output a response to the received audio file or the streamed audio from the chat bot for display in the chat session on the user interface based on the similarity characteristic.

20. The at least one machine-readable medium of claim 19, wherein the prerecorded non-speech audio file is a recording of a non-speech sound generated by an object.

* * * * *